United States Patent [19]

Ueda

[11] Patent Number: 4,740,067
[45] Date of Patent: Apr. 26, 1988

[54] PROJECTION LENS SYSTEM

[75] Inventor: Toshihiko Ueda, Toyokawa, Japan

[73] Assignee: Minolta Camera Kabushiki Kaisha, Tokyo, Japan

[21] Appl. No.: 719,894

[22] Filed: Mar. 3, 1985

[30] Foreign Application Priority Data

Apr. 3, 1984 [JP] Japan .................................. 59-67275
Jul. 30, 1984 [JP] Japan ................................. 59-159734

[51] Int. Cl.⁴ ........................... G02B 9/34; G02B 9/60
[52] U.S. Cl. ..................................... 350/465; 350/449; 350/469
[58] Field of Search ................. 350/465, 469, 449, 450

[56] References Cited

U.S. PATENT DOCUMENTS

| | | | |
|---|---|---|---|
| 2,424,827 | 7/1947 | Kaprelian | 350/469 |
| 3,482,901 | 12/1969 | Melech | 350/445 |
| 3,536,381 | 10/1970 | Pituley | 350/445 |
| 3,907,418 | 9/1975 | Okuyama | 353/77 |
| 4,093,348 | 6/1978 | Yasukuni | 350/449 |
| 4,376,570 | 3/1983 | Sussman | 350/465 X |

FOREIGN PATENT DOCUMENTS 47-35027  9/1972  Japan .
47-35028  9/1972  Japan .
57-4016   1/1982  Japan .

Primary Examiner—John K. Corbin
Assistant Examiner—Scott J. Sugarman
Attorney, Agent, or Firm—Price, Gess & Ubell

[57] ABSTRACT

There is disclosed a projection lens system for use in microfilm readers or reader-printers having an image rotation prism adjacent to the screen side of the system. The projection lens system comprises an aperture stop disposed at the screen side of the system and first to fourth lens units arranged in this order toward the film side. The first lens unit is convergent in its entirety and consists of positive and negative lens elements cemented together. The second lens unit consists of a negative meniscus lens element convex on the screen side. The third lens unit is convex both on the screen side and on the film side, and the film side surface has a larger curvature than the screen side surface. The fourth lens unit is divergent in its entirety and has a convex surface on the screen side and a concave surface on the film side.

16 Claims, 4 Drawing Sheets

FIG.1
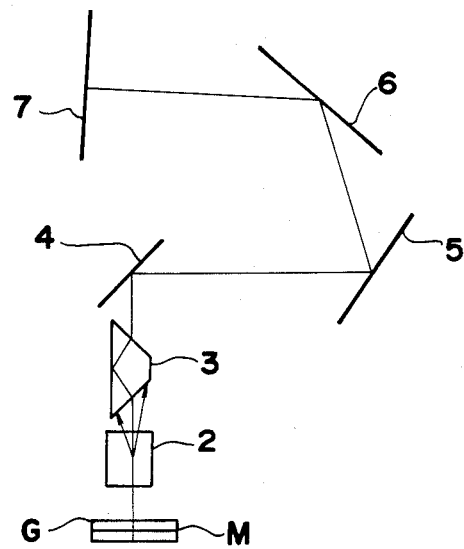
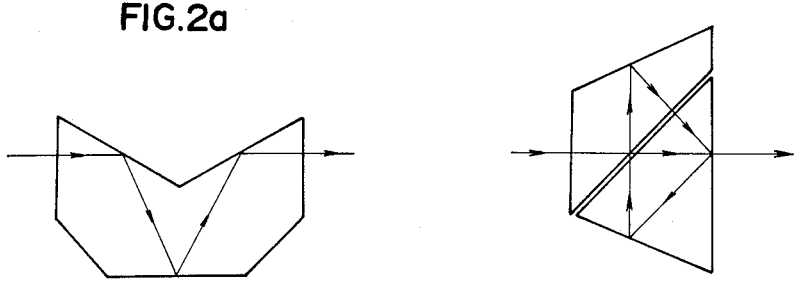
FIG.2a      FIG.2b

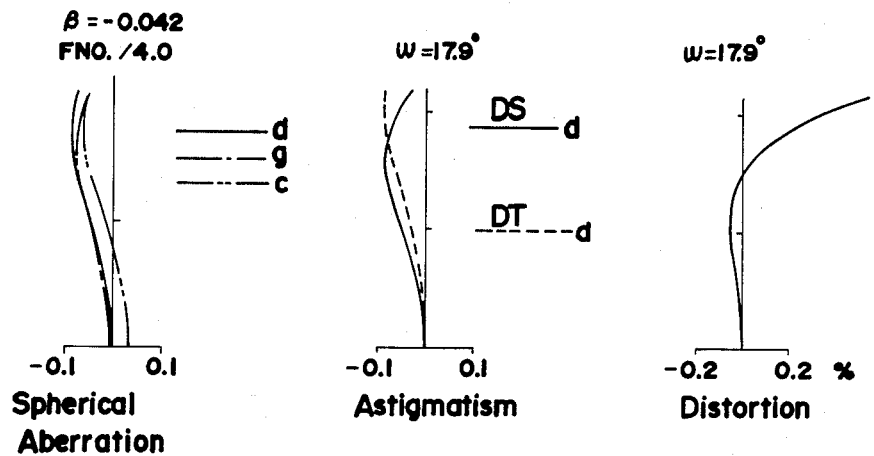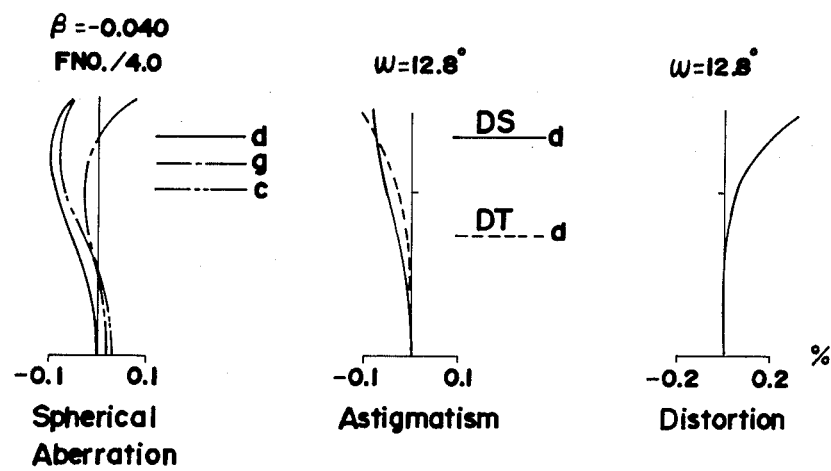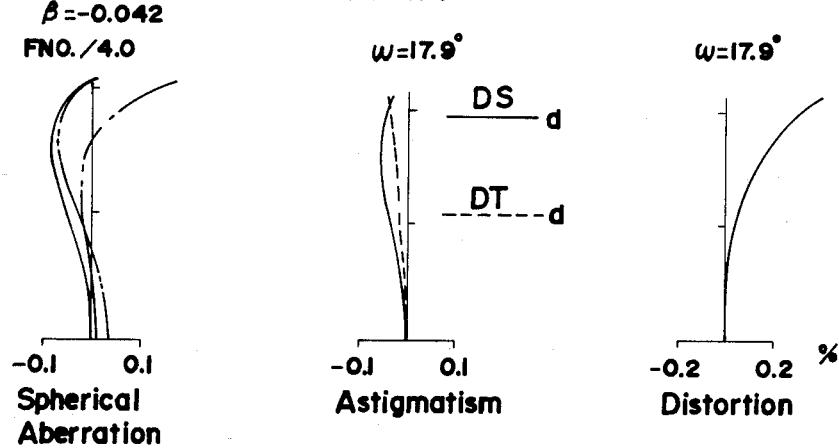

PROJECTION LENS SYSTEM

FIELD OF THE INVENTION

The present invention relates to a projection lens system for use in microfilm readers or reader-printers having image rotation means, and more particularly to a projection lens system having an aperture stop at the screen side of the system.

BACKGROUND OF THE INVENTION

Not infrequently, microfilms are prepared with the characters of original documents recorded thereon as oriented randomly, horizontally or vertically. Accordingly microfilm readers or reader-printers have heretofore been used in which an image rotation prism is interposed between the projection lens and the screen for rotating the image on the screen to orient the image as desired.

FIG. 1 is a diagram showing a microfilm reader having such image rotation means. The image on a microfilm M sandwiched between flat glass plates G is projected onto a screen 7 via a projection lens 2, an image rotation prism 3 and mirrors 4, 5, 6. The image rotation prism 3 is rotated, for example, by the mechanism disclosed in U.S. Pat. No. 3,907,418. The rotation of the prism 3 rotates the image on the screen 7 without moving the film M. The image rotation prism shown in FIG. 1 is a dove prism. Although prisms of the shape shown in FIG. 2a or 2b are also usable, dove prisms, which can be compacted, are used generally.

The projection lens system conventionally used in such a microfilm reader or reader-printer has its exit pupil positioned substantially at the center of the lens system and therefore has the drawback of requiring a large prism and forming deteriorated images when the field angle is wide, even if the prism is disposed close to the exit end of the lens system. This will be described in greater detail. The dove prism is optically equivalent to a plane-parallel glass plate which is positioned at an angle of inclination of 45° with respect to the optical axis and has aberrations for converging rays. The degree of aberration for a bundle of rays incident on the prism surface in an inclined direction with respect to the surface differs from that for another bundle of rays which is within the same circular image space as the former bundle and which is incident on the prism surface in a less inclined direction. The degree of aberration (such as axial astigmatism) is in proportion to the length of bottom surface of the prism. It is accordingly desired that the prism 3 be of the smallest possible size, but with the conventional arrangement wherein the exit pupil of the projection lens 2 is positioned at or near the center of the lens, the rays passing through various points of the microfilm spread out widely in the vicinity of the prism 3 as illustrated. Thus, the prism 3 needs to be of large size to cover the spread of the rays.

The use of a small-sized prism can be realized by disposing the aperture stop for the projection lens system at the end of the system toward the screen 7 (i.e. the long conjugate side) as proposed in Published Examined Japanese Patent Applications SHO 47-35027 and SHO 47-35028.

However, when the stop is positioned in the space at the screen side, various other drawbacks result, e.g. increased curvature of field and increased astigmatism. Especially if the field angle is wide, it becomes difficult to correct coma. Further because there is a limitation to the combination of glass materials for simultaneously correcting axial chromatic aberration and aberration associated with the magnification, it is difficult to obtain overall correction for other aberrations. Furthermore, there arises the drawback that an attempt to fully correct aberrations requires a lens which is large-sized in its entirety.

The lens system proposed as above is still unable to fully overcome these drawbacks. The system is narrow in field angle, low in the brightness of the lens and large-sized. The size of the lens system is about 1.5 in terms of telescopic ratio which is a value obtained by dividing the distance from the image side end face of the lens to the film surface by the overall focal length f. The smaller this value, the more compact is the lens system.

SUMMARY OF THE INVENTION

Accordingly, an object of the present invention is to provide an improved high-performance projection lens system for use in microfilm readers or reader-printers having an image rotation prism, the lens system including an aperture stop at the screen side of the system.

Another object of the present invention is to provide a projection lens system which is small in its entirety, has a wide field angle and is advantageous to design.

The above and other objects of the present invention can be fulfilled by a projection lens system for use in a reader or reader-printer for projecting an image of a microfilm on a screen through the projection lens system and an image rotation prism adjacent to the screen side of the system, the projection lens system comprising an aperture stop disposed at the screen side of the system, a first lens unit convergent in its entirety and consisting of positive and negative lens elements cemented together, a second lens unit consisting of a negative meniscus lens element convex on the screen side thereof, a third lens unit having a screen side convex surface and a film side convex surface with a curvature larger than that of the screen side convex surface, and a fourth lens unit divergent in its entirety and having a screen side convex surface and a film side concave surface.

Stated more particularly, the fourth lens unit comprises a compound lens element composed of two lenses which are cemented together, or a simple lens. In this case, the lens system is so constructed as to satisfy the requirements of the following inequalities:

$$0.9f < f1 < 2.0f$$

$$-10.0f < f4 < -3.0f$$

$$1.5r5 < r4 < 2.5r5$$

$$0.6f < f34 < 0.75f$$

wherein f is the focal length of the overall lens system, f1 and f4 are the focal lengths of the first and fourth lens units, respectively, f34 is the compound focal length of the third and fourth lens units, and r4 and r5 are the radii of curvature of the screen side and film side surfaces of the second lens unit, respectively, the radius of curvature being positive for the screen side convex surface.

More particularly, when the fourth lens unit comprises a lens convex on both surfaces and a lens concave on both surfaces which are cemented together, the lens system is so constructed as to further fulfill the requirement of the following inequality:

$$\nu a - \nu b > 12.0$$

wherein νa is the Abbe number of the convex lens of the fourth unit, and νb is the Abbe number of the concave lens of the fourth unit.

On the other hand, when the fourth lens unit comprises two separate lenses, the lens system is so constructed as to fulfill the requirements of the following inequalities:

$$0.9f < f1 < 2.0f$$

$$0.45 < \frac{r4 - r5}{r4 + r5} < 0.6$$

$$0.75 < f34 < 0.9f$$

The features of the present invention which are believed to be novel are set forth with particularity in the appended claims. The present invention, both as to its organization and manner of operation, together with further objects and advantages thereof, may best be understood by reference to the following description.

BRIEF DESCRIPTION OF THE DRAWINGS

FIG. 1 is a diagram showing a microfilm reader having an image rotation prism;

FIGS. 2a and 2b show image rotation prisms of other different shapes;

FIGS. 4 to 7 are diagrams showing aberration curves of the first to fourth embodiments;

FIG. 9 is a diagram showing aberration curves of the fifth embodiment;

FIG. 11 is a diagram showing aberration curves of the sixth embodiment.

DESCRIPTION OF THE PREFERRED EMBODIMENTS

The following description is provided to enable any person skilled in the optical art to make and use the invention and sets forth the best modes contemplated by the inventor of carrying out his invention. Various modifications, however, will remain readily apparent to those skilled in the art, since the generic principles of the present invention have been defined herein specifically to provide a projection lens system.

In the accompanying drawings which supplement the following tables, the lenses in accordance with the present invention are illustrated diagrammatically. The individual lens units are designated by the letter L with a subscript number (typed as an adscript number) corresponding to the consecutive numbers of the lens units from the image to object side. The radii of curvature of the lenses are indicated by r, with a subscript (adscript number) corresponding to consecutive numbers of the lens elements. The axial distances, d, along the optical axis are set forth in the tables and include both the axial spacings between the lens elements and the thickness of the lens elements. Finally, the refractive index, N, and Abbe number, ν, are provided in each of the tables. Since the specific lens parameters are provided herein to meet the requirements of a full disclosure adequate to convey the present invention to a lens designer, they should not be construed as limiting to any specific lens design as set forth in an individual embodiment.

Figure 8:
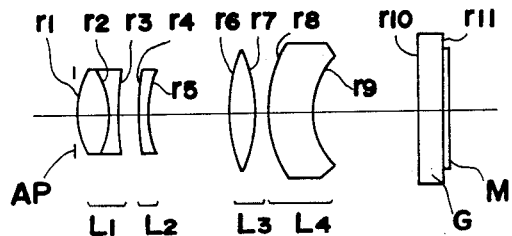
FIG. 8 is a diagram in section showing the lens system of a fifth embodiment included in the first type of the invention.
Figure 10:
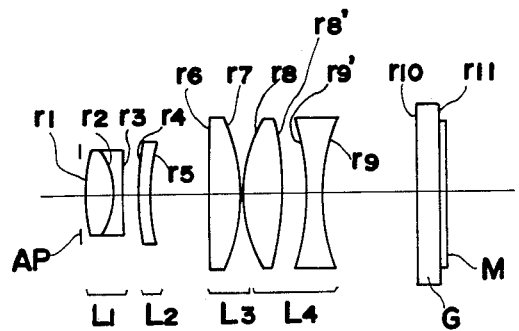
FIG. 10 is a diagram in section showing the lens system of a sixth embodiment included in a second type of the invention.
Figure 4:
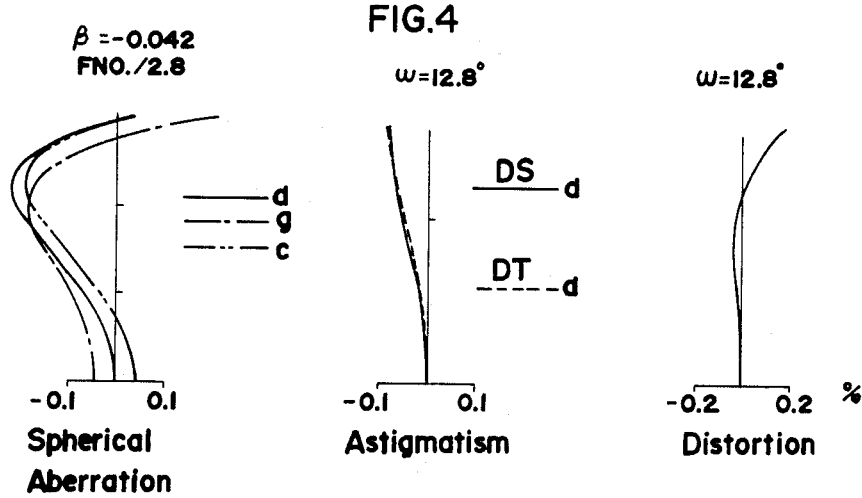
Figure 5:
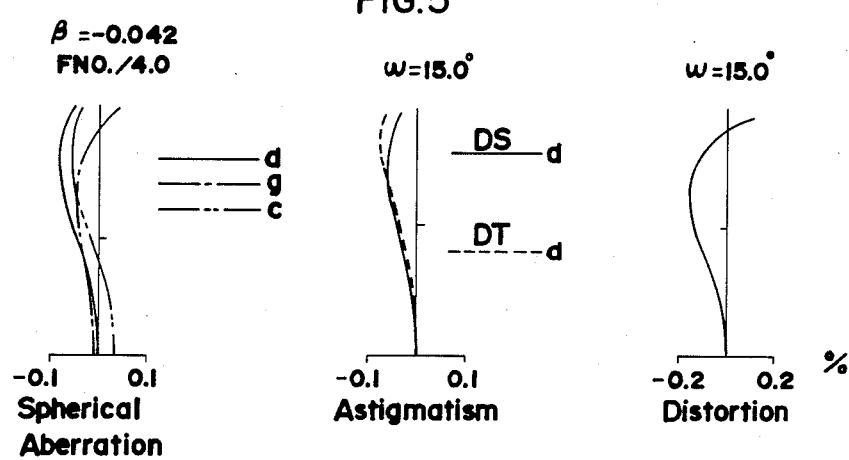
Figure 6:
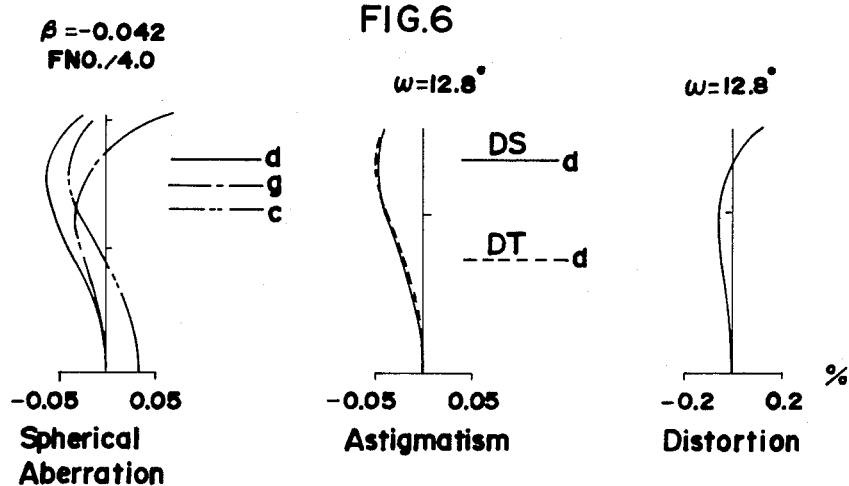

The lens systems of the present invention comprise an aperture stop disposed at the screen side (i.e. long conjugate side) of the system, and first to fourth lens units, and are divided generally into two types. With the first type, the fourth lens unit comprises a compound lens element composed of two lenses which are cemented together, or a simple lens element. First to fourth embodiments, which are of the first type, has the former structure, while a fifth embodiment has a simple lens element as the fourth unit. Since the first to fourth embodiments are identical when seen diagrammatically in section, the structures of these embodiments are shown collectively in FIG. 3. FIG. 8 shows the construction of the fifth. With the second type, on the other hand, the fourth lens unit comprises two separate lens elements. FIG. 10 shows a sixth embodiment having this construction.

Figure 3:
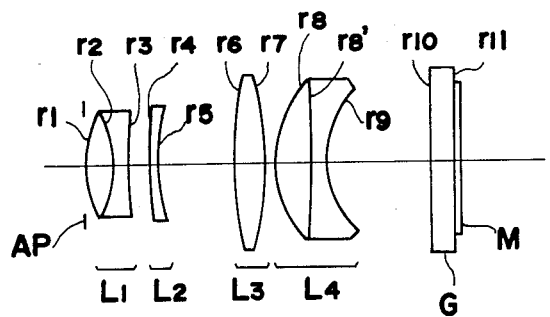
FIG. 3 is a diagram in section showing the lens system of first to fourth embodiments which are included in a first type of the invention.

The first type will be described first with reference to FIGS. 3 and 8. A microfilm indicated at M is held in intimate contact with a flat glass plate G so as to be held planar. In practice, light propagates from right to left but for the sake of convenience, the projection lens system will be described from the screen side (i.e. long conjugate side) of the system. An aperture stop AP is disposed at the screen side of the system in closest proximity thereto. Subsequently, a first lens unit L1, second lens unit L2, third lens unit L3 and fourth lens unit L4 are arranged in this order toward the film side. The first lens unit L1 is convergent in its entirety and consists of positive and negative lens elements which are cemented together. The second lens element L2 consists of a negative meniscus lens element which is convex on the screen side thereof. The third lens unit L3 is convex both on the screen side and on the film side, and the film side surface has a larger curvature than the screen side surface. The fourth lens unit L4 is divergent in its entirety and has a convex surface on the screen side and a concave surface on the film side. FIG. 3 shows that the fourth lens unit L4 comprises a lens which is convex on both sides and a lens which is concave on both sides and cemented to the convex lens. Alternatively, the lens unit L4 is in the form of a simple lens as seen in FIG. 8.

The lens system of the first type has the following features. The negative spherical aberration produced by the first lens unit L1 is corrected in the positive direction by the negative meniscus lens of the second lens unit L2. The positive Petzval's sum arising from the third lens unit L3 is corrected in the negative direction by the second lens unit L2. The first lens unit L1 from which a bundle of rays is emergent at an increased height is composed of cemented positive and negative lenses, the facilitating correction of the differences in spherical aberration due to differences in wavelength. Further when the fourth lens unit L4 comprises cemented lenses as shown in FIG. 3, it becomes easy to correct magnification chromatic aberration.

The lens system is further so constructed as to meet the following requirements.

(1) Relation of the focal length f1 of the first lens unit L1 to the focal length f of the overall lens system:

$$0.9f < f1 < 2.0f$$

If the value f1 is smaller than the above range, the curvature of field produced toward the negative direction by the first lens unit can not be fully corrected by the other lens units, while increased upward coma arises. Conversely when the value f1 is larger than the above range, marked coma occurs at the image point in the case of a wide field angle.

(2) Relation of the focal length f4 of the fourth lens unit L4 to the overall focal length f:

$$-10.0f < f4 < -3.0f$$

If f4 is below the lower limit, increased astigmatism results, whereas if it exceeds the upper limit, it becomes impossible to fully correct positive distortion.

(3) Relation between the radii of curvature, r4, r5, of opposite surfaces of the second lens unit L2:

$$1.5r5 < r4 < 2.5r5$$

When r4 is below the lower limit, increased coma occurs at a wide field angle, whereas if the value is above the upper limit, the negative deviation of Petzval's sum developing from the first and second lens units becomes difficult to correct by the other lens units to result in increased curvature of field.

(4) Relation of the compound focal length f34 of the third and fourth lens units L3, L4 to the overall focal length f:

$$0.6f < f34 < 0.75$$

If the value f34 is below the lower limit, the positive deviation of Petzval's sum in the third and fourth lens units is corrected excessively by the first and second lens units to impair the image surface, whereas if it is above the upper limit, downward coma and distortion become pronounced.

When the fourth lens unit is composed of a lens convex on both sides and a lens concave on both sides which are cemented together, the chromatic aberration can be corrected easily if the glass materials used fulfill the requirement of:

$$\nu a - \nu b > 12.0$$

wherein $\nu a$ is the Abbe number of the convex lens, and $\nu b$ is the Abbe number of the concave lens.

Next, the second type will be described with reference to FIG. 10. As is the case with the first type already described, an aperture stop is disposed at the screen side (left side) of the system, and first to fourth lens units L1 to L4 are subsequently arranged toward the film side. The lens units have generally the same features as those of the first type except that the fourth lens unit L4 comprises a lens element convex on both sides and a lens element separate from the element and concave on both sides. Accordingly it becomes easy to correct magnification chromatic aberration when the glass materials used for the two elements of the fourth lens unit L4 are different in Abbe number.

The projection lens system of the second type is so constructed as to meet the following requirements. (1) Relation of the focal length f1 of the first lens unit L1 to the focal length f of the overall system:

$$0.9f < f1 < 2.0f$$

When the value f1 is smaller than the above range, the curvature of field produced by the first lens unit L1 in the negative direction can not be fully corrected by the other lens units, and increased upward coma also results. Conversely, if the value f1 is larger than the above range, marked coma occurs at the image point when the field angle is large. This requirement is the same as the requirement (1) for the first type.

(2) Relation between the radii of curvature, r4, r5, of opposite surfaces of the second lens unit L2:

$$0.45 < \frac{r4 - r5}{r4 + r5} < 0.6$$

If the value (r4−r5)/(r4+r5) is below the lower limit, increased coma results at a wide field angle, whereas if the value is above the upper limit, the deviation in the negative direction of Petzval's sum in the first and second lens units L1, L2 becomes difficult to correct by the other units to result in increased curvature of field.

(3) Relation of the compound focal length f34 of the third and fourth lens units L3, L4 to the focal length f of the overall system:

$$0.75f < f34 < 0.9f$$

When the value f34 is below the lower limit, the deviation in the positive direction of Petzval's sum in the third and fourth lens units L3, L4 becomes excessively greater than that in the negative direction of the sum in the first and second lens units L1, L2 to result in aggravated curvature of field, whereas if it is above the upper limit, downward coma and distortion become pronounced.

Finally, detailed specifications of the foregoing embodiments are listed in the tables to follow, while the spherical aberration, astigmatism and distortion of the embodiments are illustrated in FIGS. 4 to 7, FIG. 9 and FIG. 11. In each of these diagrams, the spherical aberration is represented by curves including a solid line, one-dot-and-dash line and two-dot-and-dash line, which represent the aberration for light with the wavelengths of d line, g line and c line, respectively. The astigmatism curves are those obtained for the light of d line; the solid line DS represents the aberration in sagittal section, and the broken line DT that in tangential section.

TABLE 1

[Embodiment 1]
$f = 31.9, 2\omega = 25.6°, FNo./2.8, \beta = -0.042$

| Radius of Curvature: r | Axial distance: d | Refractive index: Nd | Abbe Number: $\nu d$ |
|---|---|---|---|
| Aperture Stop | | | |
| | 0.0 | | |
| r1 = 14.422 | | | |
| | 3.500 | 1.67003 | 47.15 |
| r2 = −10.546 | | | |
| | 1.200 | 1.70154 | 41.15 |
| r3 = 26.607 | | | |
| | 2.300 | | |
| r4 = 22.937 | | | |
| | 1.000 | 1.78560 | 42.81 |
| r5 = 11.777 | | | |
| | 9.300 | | |
| r6 = 46.005 | | | |
| | 4.500 | 1.60311 | 60.74 |
| r7 = −23.265 | | | |
| | 0.500 | | |
| r8 = 12.504 | | | |
| | 4.500 | 1.67790 | 53.38 (= $\nu a$) |
| r8' = −114.542 | | | |
| | 1.500 | 1.68150 | 36.64 (= $\nu b$) |

TABLE 1-continued

[Embodiment 1]
$f = 31.9, 2\omega = 25.6°, FNo./2.8, \beta = -0.042$

| Radius of Curvature: r | Axial distance: d | Refractive index: Nd | Abbe Number: νd |
|---|---|---|---|
| r9 = 9.306 | | | |
| | 16.690 | | |
| r10 = INF | | | |
| | 3.000 | 1.51680 | 64.12 |
| r11 = INF | | | |
| | SUMT = 47.990 | | |
| f1/f = 1.51 | f4/f = −6.46 | r4/r5 = 1.95 | |
| f34/f = 0.72 | | νa−νb = 16.74 | |

TABLE 2

[Embodiment 2]
$f = 32.4, 2\omega = 30.0°, FNo./4.0, \beta = -0.042$

| Radius of Curvature: r | Axial distance: d | Refractive index: Nd | Abbe Number: νd |
|---|---|---|---|
| Aperture Stop | | | |
| | 0.0 | | |
| r1 = 13.652 | | | |
| | 3.548 | 1.67003 | 47.15 |
| r2 = −9.605 | | | |
| | 1.214 | 1.70154 | 41.15 |
| r3 = 21.472 | | | |
| | 2.322 | | |
| r4 = 20.560 | | | |
| | 1.012 | 1.78560 | 42.81 |
| r5 = 11.207 | | | |
| | 9.958 | | |
| r6 = 34.761 | | | |
| | 3.500 | 1.60311 | 60.74 |
| r7 = −23.823 | | | |
| | 1.012 | | |
| r8 = 13.853 | | | |
| | 5.500 | 1.65844 | 50.88 (= νa) |
| r8′ = −28.684 | | | |
| | 1.215 | 1.68150 | 36.64 (= νb) |
| r9 = 9.859 | | | |
| | 13.162 | | |
| r10 = INF | | | |
| | 3.000 | 1.51680 | 64.12 |
| r11 = INF | | | |
| | SUMT = 45.444 | | |
| f1/f = 1.72 | f4/f = −3.42 | r4/r5 = 1.83 | |
| f34/f = 0.68 | | νa−νb = 14.24 | |

TABLE 3

[Embodiment 3]
$f = 31.9, 2\omega = 25.6°, FNo./4.0, \beta = -0.042$

| Radius of Curvature: r | Axial distance: d | Refractive index: Nd | Abbe Number: νd |
|---|---|---|---|
| Aperture Stop | | | |
| | 0.0 | | |
| r1 = 13.451 | | | |
| | 3.500 | 1.67003 | 47.15 |
| r2 = −9.631 | | | |
| | 1.200 | 1.70154 | 41.15 |
| r3 = 22.727 | | | |
| | 2.300 | | |
| r4 = 21.351 | | | |
| | 1.000 | 1.78560 | 42.81 |
| r5 = 10.981 | | | |
| | 9.300 | | |
| r6 = 31.561 | | | |
| | 3.900 | 1.60311 | 60.74 |
| r7 = −25.188 | | | |
| | 0.500 | | |
| r8 = 12.748 | | | |
| | 4.500 | 1.67790 | 53.38 (= νa) |
| r8′ = −87.749 | | | |
| | 1.500 | 1.68150 | 36.64 (= νb) |
| r9 = 9.057 | | | |
| | 16.690 | | |
| r10 = INF | | | |

TABLE 3-continued

[Embodiment 3]
$f = 31.9, 2\omega = 25.6°, FNo./4.0, \beta = -0.042$

| Radius of Curvature: r | Axial distance: d | Refractive index: Nd | Abbe Number: νd |
|---|---|---|---|
| | 3.000 | 1.51680 | 64.12 |
| r11 = INF | | | |
| | SUMT = 47.390 | | |
| f1/f = 1.55 | f4/f = −4.02 | r4/r5 = 1.94 | |
| f34/f = 0.68 | | νa−νb = 16.74 | |

TABLE 4

[Embodiment 4]
$f = 31.9, 2\omega = 35.8°, FNo./4.0, \beta = -0.042$

| Radius of Curvature: r | Axial distance: d | Refractive index: Nd | Abbe Number: νd |
|---|---|---|---|
| Aperture Stop | | | |
| | 0.0 | | |
| r1 = 13.882 | | | |
| | 3.490 | 1.67830 | 48.97 |
| r2 = −8.828 | | | |
| | 1.190 | 1.71060 | 43.25 |
| r3 = 20.986 | | | |
| | 2.280 | | |
| r4 = 27.362 | | | |
| | 1.000 | 1.78560 | 42.81 |
| r5 = 12.759 | | | |
| | 7.000 | | |
| r6 = 39.511 | | | |
| | 3.900 | 1.60311 | 60.74 |
| r7 = −21.531 | | | |
| | 0.500 | | |
| r8 = 14.154 | | | |
| | 5.500 | 1.67100 | 51.73 (= νa) |
| r8′ = −40.749 | | | |
| | 1.500 | 1.68150 | 36.64 (= νb) |
| r9 = 10.487 | | | |
| | 16.950 | | |
| r10 = INF | | | |
| | 3.000 | 1.51680 | 64.12 |
| r11 = INF | | | |
| | SUMT = 46.310 | | |
| f1/f = 1.93 | f4/f = −6.38 | r4/r5 = 2.14 | |
| f34/f = 0.64 | | νa−νb = 15.09 | |

TABLE 5

[Embodiment 5]
$f = 32.0, 2\omega = 25.6°, FNo./4.0, \beta = -0.040$

| Radius of Curvature: r | Axial distance: d | Refractive index: Nd | Abbe Number: νd |
|---|---|---|---|
| Aperture Stop | | | |
| | 0.0 | | |
| r1 = 13.287 | | | |
| | 3.500 | 1.66755 | 41.98 |
| r2 = −9.838 | | | |
| | 1.198 | 1.70154 | 41.15 |
| r3 = 38.145 | | | |
| | 2.299 | | |
| r4 = 24.172 | | | |
| | 1.000 | 1.78472 | 25.75 |
| r5 = 9.730 | | | |
| | 9.836 | | |
| r6 = 30.327 | | | |
| | 2.800 | 1.49520 | 79.74 |
| r7 = −19.253 | | | |
| | 1.000 | | |
| r8 = 12.587 | | | |
| | 6.000 | 1.64050 | 60.08 |
| r9 = 8.998 | | | |
| | 13.000 | | |
| r10 = INF | | | |
| | 3.000 | 1.51680 | 64.12 |
| r11 = INF | | | |
| | SUMT = 43.633 | | |
| f1/f = 1.00 | f4/f = −4.45 | r4/r5 = 2.48 | |

TABLE 5-continued

[Embodiment 5]
$f = 32.0, 2\omega = 25.6° \text{ FNo.}/4.0 \ \beta = -0.040$

| Radius of Curvature: r | Axial distance: d | Refractive index: Nd | Abbe Number: νd |
|---|---|---|---|
| f34/f = 0.69 | | | |

TABLE 6

[Embodiment 6]
$f = 31.9, \quad 2\omega = 35.8°, \quad \text{FNo.}/4.0, \quad \beta = -0.042$

| Radius of Curvature: r | Axial distance: d | Refractive index: Nd | Abbe Number: νd |
|---|---|---|---|
| Aperture Stop | | | |
| | 0.0 | | |
| r1 = 15.157 | | | |
| | 3.490 | 1.67790 | 53.38 |
| r2 = −7.968 | | | |
| | 1.190 | 1.71060 | 43.25 |
| r3 = 60.317 | | | |
| | 2.280 | | |
| r4 = 48.695 | | | |
| | 1.000 | 1.78560 | 42.81 |
| r5 = 14.551 | | | |
| | 7.000 | | |
| r6 = 653.048 | | | |
| | 3.900 | 1.61762 | 52.70 |
| r7 = −25.236 | | | |
| | 0.500 | | |
| r8 = 18.400 | | | |
| | 4.500 | 1.67790 | 55.38 |
| r8′ = −35.247 | | | |
| | 3.000 | | |
| r9′ = −22.388 | | | |
| | 1.500 | 1.68150 | 36.64 |
| r9 = 17.113 | | | |
| | 11.000 | | |
| r10 = INF | | | |
| | 3.000 | 1.51680 | 64.12 |
| r11 = INF | | | |
| SUMT = 42.860 | | | |

$f1/f = 1.02 \quad \frac{r4 - r5}{r4 + r5} = 0.54 \quad f34/f = 0.82$

These tables and diagrams reveal that the projection lens system of the present invention has a wide field angle of 26° to 36°, is as bright as 2.8 to 4.0 in terms of FNo., has a telescopic ratio of about 1.4 and can therefore be compacted with aberrations fully corrected. The compacted projection lens system permits use of a small-sized image rotation prism, consequently making readers or reader-printers small-sized, while images can be projected with improved quality.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. In a reader or reader-printer for projecting an image of a microfilm on a screen through a projection lens system and an image rotation prism adjacent to the screen side of the projection lens system, the projection lens system comprising;
   an aperture stop disposed at the screen side of the system,
   a first lens unit convergent in its entirety and consisting of positive and negative lens elements cemented together,
   a second lens unit consisting of a negative meniscus lens element convex on the screen side,
   a third lens unit having a screen side convex surface and a film side convex surface with a curvature larger than that of the screen side convex surface, and
   fourth lens unit divergent in its entirety and having a convex surface on the screen side and a concave surface on the film side.

2. A projection lens system as claimed in claim 1, wherein the fourth lens unit comprises a compound lens element composed of a convex lens on both sides and a concave lens on both sides which are cemented together.

3. A projection lens system as claimed in claim 2, wherein the system fulfills the following conditions:

$$0.9f < f1 < 2.0f$$

$$-10.0f < f4 < -3.0f$$

$$1.5r5 < r4 < 2.5r5$$

$$0.6f < f34 < 0.75f$$

wherein,
f represents the focal length of the overall lens system, f1 and f4 represent the focal lengths of the first and fourth lens units, respectively, f34 represents the compound focal length of the third and fourth lens units, and r4 and r5 represent the radii of curvature of the screen side and film side surfaces of the second lens unit, respectively, the radius of curvature being positive for the screen side convex surface.

4. A projection lens system as claimed in claim 3, wherein the system further fulfills the following condition:

$$\nu a - \nu b > 12.0$$

wherein, νa and νb represent the Abbe number of the convex and concave lens elements, respectively.

5. A projection lens system as claimed in claim 1, wherein the fourth lens unit comprises a simple lens.

6. A projection lens system as claimed in claim 5, wherein the system fulfills the following conditions:

$$0.9f < f1 < 2.0f$$

$$-10.0f < f4 < -3.0f$$

$$1.5r5 < r4 < 2.5r5$$

$$0.6f < f34 < 0.75f$$

wherein,
f represents the focal length of the overall lens system, f1 and f4 represent the focal lengths of the first and fourth lens units, respectively, f34 represents the compound focal length of the third and fourth lens units, and r4 and r5 represent the radii of curvature of the screen side and film side surfaces of the second lens unit, respectively, the radius of curvature being positive for the screen side convex surface.

7. A projection lens system as claimed in claim 1, wherein the fourth lens unit comprises a convex lens on both sides and a concave lens on both sides separate from the convex lens.

8. A projection lens system as claimed in claim 7, wherein the system fulfills the following conditions:

$$0.9f < f1 < 2.0f$$

$$0.45f < \frac{r4 - r5}{r4 + r5} < 0.6$$

$$0.75 < f34 < 0.9f$$

wherein, f represents the focal length of the overall lens system, f1 and f4 represent the focal lengths of the first and fourth lens units, respectively, f34 represents the compound focal length of the third and fourth lens units, and r4 and r5 represent the radius of curvature of the screen side and film side surfaces of the second lens unit, respectively, the radius of curvature being positive for the screen side convex surface.

9. In a reader or reader-printer for projecting an image of a microfilm on a screen through a projection lens system and an image rotation prism adjacent to the screen side of the projection lens system, the projection lens system comprising:
an aperture stop disposed at the screen side of the system;
a first lens unit convergent in its entirety,
a second negative lens units;
a third lens unit having a screen side convex surface and a film side convex surface with a curvature larger than that of the screen side convex surface, and
a fourth lens unit divergent in its entirety, wherein the system fulfills the following conditions:

$$0.9f < f1 < 2.0f$$

$$-10.0f < f4 < -3.0f$$

$$1.5r5 < f4 < 2.5r5$$

$$0.6 < f34 < 0.75f$$

wherein, f represents the focal length of the overall lens system, f1 and f4 represent the focal length of the first and fourth lens units, respectively, f34 represents the compound focal length of the third and fourth lens units, and r4 and r5 reprsent the radii of curvature of the screen side and film side surfaces of the second lens unit, rspectively, the radius of curvature being positive for the screen side convex surface.

10. A projection lens system as claimed in claim 9, wherein the fourth lens unit comprises a compound lens element composed of a convex lens on both sides and a concave lens on both sides which are cemented together.

11. A projection lens system as claimed in claim 9, wherein the fourth lens unit comprises a simple lens.

12. A projection lens system comprising the following design parameters:

| f = 31.9, 2ω = 25.6°, FNo./2.8, β = −0.042 ||||
| Radius of Curvature: r | Axial distance: d | Refractive index: Nd | Abbe Number: νd |
|---|---|---|---|
| Aperture Stop | | | |
| | 0.0 | | |
| r1 = 14.422 | | | |
| | 3.500 | 1.67003 | 47.15 |
| r2 = −10.546 | | | |
| | 1.200 | 1.70154 | 41.15 |
| r3 = 26.607 | | | |
| | 2.300 | | |
| r4 = 22.937 | | | |
| | 1.000 | 1.78560 | 42.81 |
| r5 = 11.777 | | | |
| | 9.300 | | |
| r6 = 46.005 | | | |
| | 4.500 | 1.60311 | 60.74 |
| r7 = −23.265 | | | |
| | 0.500 | | |
| r8 = 12.504 | | | |
| | 4.500 | 1.67790 | 53.38 (= νa) |
| r8′ = −114.542 | | | |
| | 1.500 | 1.68150 | 36.64 (= νb) |
| r9 = 9.306 | | | |
| | 16.690 | | |
| r10 = ∞ | | | |
| | 3.000 | 1.51680 | 64.12 |
| r11 = ∞ | | | |

13. In a reader or reader-printer for projecting an image of a microfilm on a screen through a projecton lens system and an image rotation prism adjacent to the screen side of the projection lens system, the projection lens system comprising:
an aperture stop disposed at the screen side of the system;
a first lens unit convergent in its entirety and consisting of positive and negative lens elements cemented together;
a second lens unit consisting of a negative meniscus lens element convex on the screen side;
a third lens unit having a screen side convex surface and a film side convex surface with a curvature larger than than that of the screen side convex surface; and
a fourth lens unit divergent in its entirety and comprising a compound lens element composed of a convex lens on both sides and a concave lens on both sides which are cemented together, wherein the system fulfills the following conditions:

$$0.9f < f < 2.0f$$

$$-10.0f < f4 < -3.0f$$

$$1.5r5 < r5 < 2.5r5$$

$$0.6 < f34 < 0.75f$$

wherein, f represents the focal length of the overall lens system, f1 and f4 represent the focal lengths of the first and fourth lens units, respectively, f34 represents the compound focal length of the third and fourth lens units, and r4 and r5 represent the radii of curvature of the screen side and film side surfaces of the second lens unit, repectively, the radius of curvature being positive for the screen side convex surface.

14. A projection lens system as claimed in claim 13, wherein the system further fulfills the following condition:

$$\nu a - \nu b > 12.0$$

wherein, $\nu a$ and $\nu b$ represent the Abbe number of the convex and concave lens elements of the fourth lens unit, repectively.

15. In a reader or reader-printer for projecting an image of a microfilm on a screen through a projection lens system and an image rotation prism adjacent to the screen side of the projection lens system, the projection lens system comprising:

an aperture stop disposed at the scren side of the system;

a first lens unit convergent in its entirety and consisting of positive and negative lens elements cemented together;

a second lens unit consisting of a negative meniscus lens element convex on the screen side;

a third lens unit having a screen side convex surface and a film side convex surface with a curvature larger than that of the screen side convex surface; and a fourth lens unit of a simple lens element divergent in its entirety and having a convex surface on the screen side and a concave surface on the film side, wherein the system fulfills the following conditions:

$$0.9f < f1 < 2.0f$$

$$-10.0f < f4 < -3.0f$$

$$1.5r5 < r4 < 2.5r5$$

$$0.6f < f34 < 0.75f$$

wherein, f represents the focal length of the overall lens system, f1 and f4 represent the focal lengths of the first and fourth lens units, respectively, f34 represents the compound focal length of the third and fourth lens units, and r4 and r5 represent the radii of curvature of the screen side and film side surfaces of the second lens unit, repectively, the radius of curvature being positive for the screen side convex surface.

16. In a reader or reader-printer for projecting an image of a microfilm on a screen through a projection lens system and an image rotation prism adjacent to the screen side of the projection lens system, the projection lens system comprising:

an aperture stop disposed at the screen side of the system;

a first lens unit convergent in its entirety and consisting of positive and negative lens elements cemented together;

a second lens unit consisting of a negative meniscus lens element convex on the screen side;

a third lens unit having a screen side convex surface and a film side convex surface with a curvature larger than that of the screen side convex surface; and a fourth lens unit divergent in its entirety and having a convex lens on both sides and a concave lens on both sides separate from the convex lens, wherein the system fulfills the following conditions:

$$0.9f < f1 < 2.0f$$

$$0.45f < \frac{r4 - r5}{r4 + r5} < 0.6$$

$$0.75 < f34 < 0.9f$$

wherein, f represents the focal length of the overall lens system, f1 and f4 represent the focal lengths of the first and fourth lens units, respectively, f34 represents the compound focal length of the third and fourth lens units, and r4 and r5 represent the radius of curvature of the screen side and film side surfaces of the second lens unit, respectively, the radius of curvature being positive for the screen side convex surface.

* * * * *